United States Patent [19]

Sherman et al.

[11] Patent Number: 5,659,710
[45] Date of Patent: Aug. 19, 1997

[54] CACHE COHERENCY METHOD AND SYSTEM EMPLOYING SERIALLY ENCODED SNOOP RESPONSES

[75] Inventors: Kevin Lee Sherman, Essex Junction; John Edward Derrick, Milton, both of Vt.

[73] Assignee: International Business Machines Corporation, Armonk, N.Y.

[21] Appl. No.: 564,888

[22] Filed: Nov. 29, 1995

[51] Int. Cl.⁶ .................................................. G06F 13/16
[52] U.S. Cl. ............................................................. 395/473
[58] Field of Search ............................................... 395/473

[56] References Cited

U.S. PATENT DOCUMENTS

| | | | |
|---|---|---|---|
| 5,025,365 | 6/1991 | Mathur et al. | 364/448 |
| 5,228,135 | 7/1993 | Ikumi | 395/458 |
| 5,249,283 | 9/1993 | Boland | 395/473 |
| 5,313,591 | 5/1994 | Averill | 395/299 |
| 5,345,578 | 9/1994 | Manasse | 395/473 |
| 5,353,415 | 10/1994 | Wolford et al. | 395/306 |
| 5,440,707 | 8/1995 | Hayes et al. | 395/403 |

FOREIGN PATENT DOCUMENTS 0669578  8/1995  European Pat. Off. .

OTHER PUBLICATIONS

IBM Technical Disclosure Bulletin, vol. 38, No. 8, Aug. 1995, p. 195, Title: "Apparatus For High Throughput Protocols In High-Performance Computer Systems" Author: So, S., et al.

IBM Technical Disclosure Bulletin, vol. 34, No. 1, Jun. 1991, pp. 254-256, Title: "Fixed-Length Pipelined-Bus-Protocol For Snoop Cache" Author: Murata, H., et al.

Hewlett-Packard Journal, vol. 45, No. 3, Jun. 1994, pp. 8-30, Title: "Corporate Business Servers: An Alternative To Mainframes For Business Computing" Author: Alexander T. B., et al.

Patterson et al., *Computer Organization & Design, The Hardware/Software Interface*, pp. 610-614, 1990.

*PowerPC 604 RISC Microprocessor User's Manual*, IBM and Motorola, "Data Cache Coherency Protocol," Section 3.6.1 pp. 3-10 to 3-12 and Snoop Response to Bus Operations, Section 3.9.5, pp. 3-19, Nov. 1994.

*Pentium Family User's Manual*, vol. 1, Data Book, by Intel, "Basic Cache Consistency Mechanism," Section 20.1.3, pp. 20-8 to 20-9, 1994.

Primary Examiner—Eddie P. Chan
Assistant Examiner—Reginald G. Bragdon
Attorney, Agent, or Firm—Heslin Rothenberg, P.C.

[57] ABSTRACT

A cache coherency method and system are provided for ensuring coherency of accessed data for each bus master of a plurality of bus masters in a processing system, wherein at least some bus masters have a cache means connected to a system bus, which provides communication to a main memory for access of data stored therein. Each of these at least some bus masters also includes snoop monitor logic, e.g., residing within a bus interface unit (BIU), for monitoring the presence of a coherent memory transaction on the system bus and for broadcasting in response thereto a unidirectional snoop response signal with reference to the bus master's caching means whenever the coherent memory transaction is initiated by other than that bus master. The snoop monitors are electrically interconnected, with each snoop monitor receiving at a separate signal input the unidirectional snoop response signal broadcast by each other snoop monitor of the plurality of snoop monitors. Each snoop response signal broadcast comprises one snoop response of a set of N predetermined snoop responses, each snoop response being M binary bits in length with a single bit of each snoop response being broadcast in a single clock cycle of the processing system such that M binary bits are preferably transferred over M consecutive clock cycles, wherein $M \geq 1$ and $N=2^M$.

19 Claims, 2 Drawing Sheets

CACHE COHERENCY METHOD AND SYSTEM EMPLOYING SERIALLY ENCODED SNOOP RESPONSES

TECHNICAL FIELD

The present invention relates in general to computer systems, and more particularly, to a method and system for maintaining cache memories coherent within a multiprocessor system wherein cache memory is associated with each of a plurality of bus masters.

BACKGROUND ART

Modern personal computer systems generally include one or more processors and a microprocessor cache memory system for each processor. A cache memory is a small amount of very fast, expensive, zero wait state memory which is used to store frequently used code and data. The cache system is the interface between the respective processor and the system bus and is used to bridge the gap between fast processor cycle times and relatively slow memory access times.

When a processor generates a read request and the requested data resides in its cache memory, then a cache read hit takes place, and the processor can obtain the data from the cache memory without having to access main memory. If the data is not in the cache memory, then a cache read miss occurs, and the memory request is forwarded to the system and the data is retrieved from the main memory, as would normally be done if the cache system did not exist. On a cache miss, the data that is retrieved from main memory is provided to the processor and is also written into the cache memory due to the statistical likelihood that this data will be requested again by the processor. Likewise, if a processor generates a write request, the write data can be written to the cache memory without having to access main memory over the system bus (in a write-back cache). This increases processor efficiency and reduces host bus utilization, allowing more bandwidth for other processors and bus masters.

An efficient cache system yields a high "hit rate," which is the percentage of cache hits that occur during all memory accesses. When a cache system has a high hit rate, the majority of memory accesses are serviced with zero wait states. Therefore, a processor operating out of its local cache memory has a much lower "bus utilization." This reduces system bus bandwidth used by the processor, making more bandwidth available for other bus masters. In addition, a processor can operate out of its local cache memory when it does not have control of the system bus, thereby increasing efficiency of the computer system.

Two principal types of cache systems are referred to as write-through cache systems and write-back cache systems. In write-through systems, write data from the processor is written into the cache and is also immediately written into main memory. This guarantees that the copy of data in the cache memory is coherent or consistent with the data in main memory. A drawback of write-through cache systems, however, is that host bus utilization is required for each processor write.

In a write-back cache system, processor write data is only written into the cache memory, and the write data is only written back to main memory when another device requests the data or it is cast out and replaced by a request for new data. When processor write data is written only into the cache system, the data held in the corresponding location in main memory is referred as stale or invalid data. The cache location is said to hold modified data. In write-back cache systems, the cache controller is required to watch or "snoop" the system bus during cycles by other bus masters, e.g., processors, as described below.

Cache management is generally performed by a device referred to as a cache controller. A principal cache management policy is the preservation of cache coherency. Cache coherency refers to the requirement that any bus device requesting data receives the most recent version of the data. The owner of a location's data is generally defined as the respective location having the most recent version of the data residing in the respective memory location. The owner of data can be either an unmodified location in main memory, or a modified location in a write-back cache.

In computer systems where independent bus masters can access main memory, there is a possibility that a bus master, such as another processor, or a direct memory access controller, network or disk interface card, or video graphics card, might alter the contents of a main memory location that is duplicated in the cache memory. When this occurs, the cache memory is said to hold "stale" or invalid data. Problems would result if the processor inadvertently obtained this invalid data. In order to maintain cache coherency, therefore, it is necessary for the cache controller to monitor the system bus when the processor does not control the bus to see if another bus master accesses main memory. This method of monitoring the bus is referred to in the art as "snooping."

The cache controller must also monitor the system bus during main memory reads by a bus master in a write-back cache design because of the possibility that a previous processor write may have altered a copy of data in the cache memory that has not been updated in main memory. This is referred to as read snooping. On a read snoop hit where the cache memory contains data not yet updated in main memory, the cache controller generally provides the respective data to main memory and to the requesting bus master.

The cache controller must also monitor the system bus during memory writes because the bus master may write to or alter a memory location that resides in its cache memory. This is referred to as write snooping. On a write snoop hit, the cache entry is either marked invalid in the cache controller, signifying that this entry is no longer correct, or the cache memory is updated along with the main memory.

Therefore, when a bus master reads or writes to main memory in a write-back cache design, or writes to main memory in a write-through cache design, the cache controller must latch the system address and see if the main memory location being accessed also resides in the cache memory. If a copy of the data from this location does reside in the cache memory, then the cache controller takes the appropriate action depending upon whether a read or write snoop hit has occurred. This prevents stale data from being stored in main memory and the cache memory, thereby preserving cache coherency.

The problem of inconsistency or cache incoherence can occur for any one of multiple reasons; for example, as a result of sharing of writable data, from process migration, or from input/output (I/O) activity. A number of methods have been proposed/implemented for handling coherency of memory or data. For example, reference U.S. Pat. Nos. 5,025,365; 5,249,283; and 5,353,415.

One simple solution to the cache coherency problem is to require main memory to record the location of each encached copy of data associated with a main memory address. When any encached copy is modified, the results are automatically stored in the cache of the processor performing the processing, copied through to the corresponding address in main memory, and then copied to each additional cache that also has data associated with the main address. This copy back process works quite well for two processor systems; however, as the number of processors increases, the interconnect sub-system tends to become overloaded by frequent copying back of information to main memory and the frequent updating of all encached copies of the information. In such a system, the gains in processor power provided by multiple processors may be negated by the overloading of the system interconnect by update messages to the processor caches.

Another method is to use open-collector signals for the address/snoop response. This allows multiple bus masters to drive signals concurrently, while only requiring the use of three signal lines, that is, a shared signal line, a modified signal line, and a retry signal line. The disadvantage is that the minimum turnaround time for the address bus is four clock cycles, i.e., if signals are changing with respect to the same clock edge (rising or falling). The minimum turnaround time for the address bus can be reduced to three clock cycles if the signals are allowed to change with respect to both the rising and falling clock edge. However, this complicates the control logic for the address/snoop response signals, which is usually one of the critical path signals.

Thus, a need continues to exist for an improved method and system for handling cache coherency in multiple bus master systems, such as multiprocessor systems, and more particularly, for an approach which avoids excessive delay in either address bus turnaround time or snoop response time. The present invention addresses this need.

SUMMARY OF THE INVENTION

Briefly summarized, the invention comprises in one aspect a cache coherency system for ensuring coherency of accessed data for a bus master of a plurality of bus masters in a processing system, with at least some bus masters having cache means connected to a system bus which provides communication to a main memory for access of data stored therein. The coherency system includes multiple snoop monitors, each snoop monitor being associated with a particular bus master of the at least some bus masters having cache means. This snoop monitor logic monitors a coherent memory transaction on the system bus and broadcasts in response thereto a unidirectional snoop response signal with reference to the associated bus master's cache means, i.e., when the coherent memory transaction is initiated by another bus master. The snoop monitors are electrically interconnected such that each snoop monitor receives at separate single signal inputs the unidirectional snoop response signals generated in response to the coherent memory transaction on the system bus. Each snoop response signal broadcast comprises one snoop response of a set of N predetermined snoop responses. Each snoop response comprises a serially encoded signal of M binary bits in length with a single bit of each response being transferred in a single clock cycle of the processing system such that the M binary bits are transferred over M clock cycles, wherein $M \geq 1$ and $N=2^M$. As one implementation, at least some of the bus masters may comprise processors connected in a multiprocessor system. Further, M may equal two such that each snoop response signal broadcast comprises one snoop response of a set of four predetermined snoop responses including a cache miss response, a cache hit with data modified response, a cache hit with data modified response, and an address retry required response.

In another aspect, a method for ensuring coherency of accessed data for each processor of a plurality of processors in a multiprocessor system is provided. Each processor has a cache means connected to a system bus which provides communication to a main memory for access of data stored therein. Each processor further includes a snoop monitor coupled to the processor's cache. The method includes the steps of: monitoring the system bus for a coherent memory transaction; at least some of the processors in the multiprocessor system responding to a coherent memory transaction by broadcasting a unidirectional snoop response signal generated by the snoop monitor with reference to that processor's cache, each snoop response signal generated comprising one snoop response of a set of N predetermined snoop responses, each snoop response being a serially encoded signal M binary bits in length with a single bit of each snoop response being transferred in a single clock cycle of the multiprocessor system such that the M binary bits are transferred over M clock cycles, wherein $M \geq 1$ and $N=2^M$; and simultaneously providing each generated unidirectional snoop response signal to each other snoop monitor in the multiprocessor system via a separate signal input at the snoop monitors. The unidirectional snoop response signals received being employed by the processor comprising master of the system bus to ensure coherency of accessed data.

To restate, a novel method and system for handling cache coherency within a processing system are provided herein. The broadcast approach presented distributes snoop responses without delaying return of data to the requesting device and maintains device pin count at a minimum. By serializing snoop responses, each response can be broadcast over a single signal line to each other bus master. Various response states can be encoded by transferring multiple binary bits in consecutive clock cycles on the single signal line. For systems using cache-to-cache transfers of modified data, the snoop response is encoded to provide an early indication (preferably within the first clock cycle of the snoop response) to the target device, i.e., memory controller on the system bus, to continue or to abort the transaction. For systems using cache-to-cache transfer of modified, exclusive or shared data, the snoop response can be encoded to provide an early indication (preferably within the first clock cycle) to the other caching devices that they may transfer the data to the requesting device. The approach employs unidirectional signals which eliminate turnaround time required in bi-directional signal approaches. One address transfer can occur every two clock cycles for coherent memory transactions employing this invention, i.e., assuming that a snoop response is defined as requiring two clock cycles. Each bus master receives a separate response signal line input for each other bus master connected to the system bus.

BRIEF DESCRIPTION OF THE DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

BEST MODE FOR CARRYING OUT THE INVENTION

Figure 1:
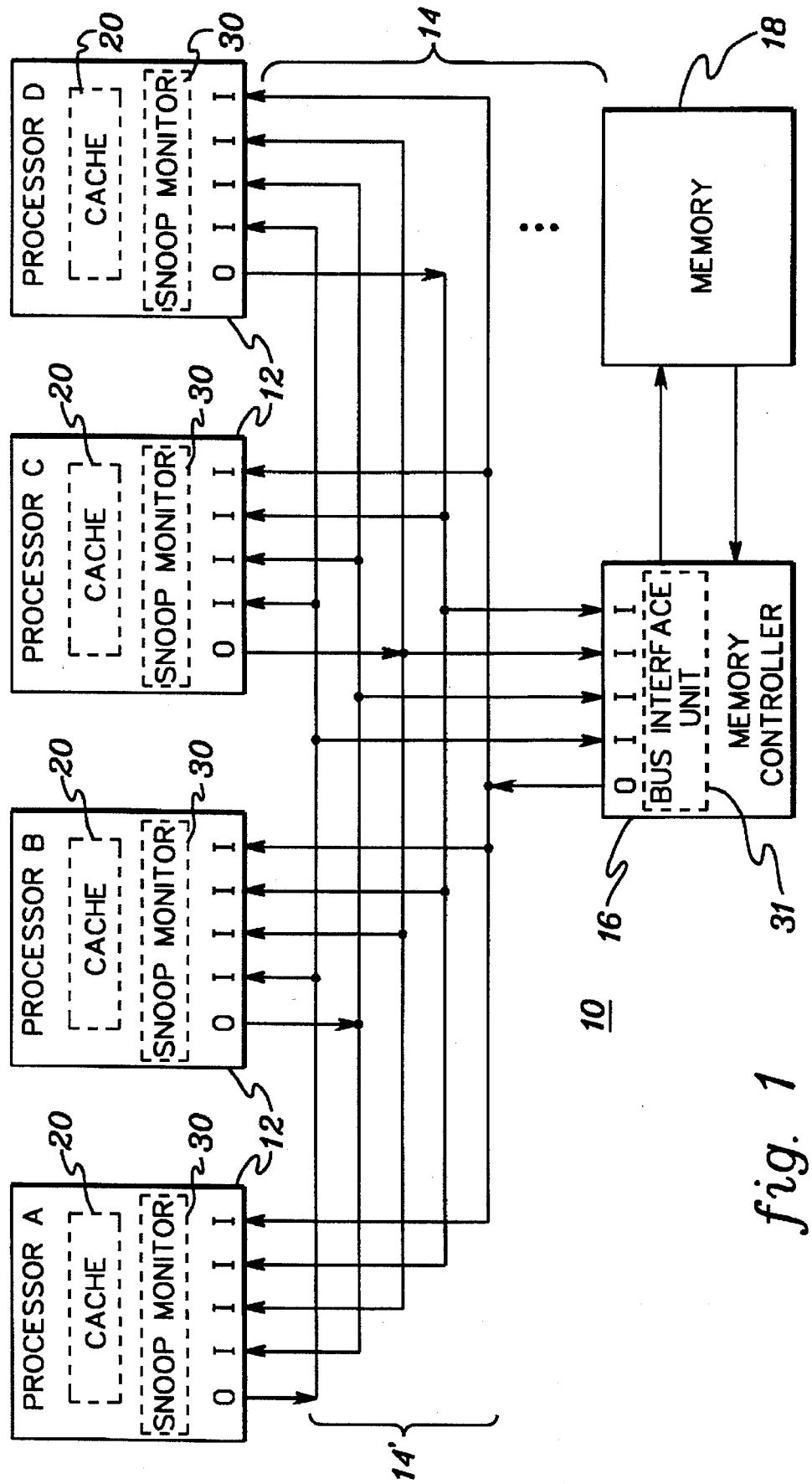
FIG. 1 is a block diagram representation of a multiprocessor system employing a snoop coherency system in accordance with the present invention.

FIG. 1 is a block diagram of a multiple processor system, denoted 10, which includes a generalized interconnect or system bus 14 for data, address and control signals. Within system 10, each processor 12 (processor A, processor B, processor C & processor D) is connected to bus 14, which partially includes the depicted interconnect wiring 14'. Note that multiprocessor system 10 is depicted herein by way of example only. The cache coherency concepts presented are applicable to any system having multiple bus masters, e.g., direct memory access controllers, network or disk interface cards, videographic cards, etc., with cache memory connected to a system bus. This includes uniprocessor systems.

Within system 10, each processor 12 includes a conventional cache 20 and a snoop monitor 30 tightly coupled to cache 20 and to system bus 14. Snoop monitor logic 30 may reside, for example, within a bus interface unit coupling the respective processor to system bus 14. Alternatively, each monitor could comprise a separate logic unit within the processor. Again, whatever the implementation, snoop monitor 30 is closely coupled to both cache 20 and to the respective processor's bus interface unit, and hence to system bus 14.

Each processor 12 is coupled to main memory 18 across system bus 14 and a memory controller 16. Memory controller 16 includes a bus interface unit 31 connected to bus 14 to receive as inputs T the unilateral snoop response signals broadcast by the processors 12 of system 10. Note that the interconnections 14' implementing the snoop monitoring approach of the present invention each comprise a single signal line or broadcast output '0' from each of the respective bus masters 12 & 16 in system 10 to each of the other bus masters in the system for simultaneous broadcasting of a generated unidirectional signal. More particularly, each bus master outputs on a dedicated line a serially encoded snoop response signal, i.e., when appropriate, to each of the other bus masters in system 10. The exception is bus interface unit (BIU) 31 of memory controller 16. Since controller 16 has no cache, the signal output from BIU 31 might comprise a simple address received/retry response. For example, should the bus device's coherent memory transaction be unreceivable at controller 16, then BIU would output to all snoop monitors, and thereby to the target device, an address retry required response. Again, each signal line is in dedicated to carrying an outputted snoop response signal in parallel to each other bus master connected thereto. Use of a single signal broadcast from each bus master is possible pursuant to the invention through an encoding of each snoop response in M bits, transferred preferably consecutively over M clock cycles of the processing system. For example, if each encoded snoop response comprises two bits in length, then four predetermined snoop responses are possible, while three encoded bits would allow up to eight predetermined responses. Examples are provided herein below of two bit encoded snoop responses.

As briefly noted initially, in a multiprocessing system with caching devices it is important to provide a method to ensure memory coherence between the bus devices. For example, when one processor requests data from memory, another processor may have the recently modified data still in its cache. Each processor must thus indicate if it has a copy of the data in its cache and, if present, whether this data has been modified from the version stored in main memory. If the data has been modified, then the bus device with the modified data indicates that the address transfer needs to be retried to provide sufficient time to update main memory, or if the system configuration permits, that the modified data is being sent directly to the requesting bus device, in which case the coherent memory transaction need not be retried. In addition to providing information on the requested data, each bus device must indicate whether it received the address correctly or was unable to accept the new address. For this reason, the memory controller must also output 'O' a response. If an address overflow occurs, then the memory controller indicates that the address transfer must be retried.

By way of further example, if processor A requests data from memory, processor B, C or D may have a copy of the data in its cache. Assuming that processors B, C and D each have an modified copy of the data, then the memory controller might indicate that the address transfer has been received correctly (response 1), and processors B, C and D would each broadcast that they have a shared copy of the data (response 2). As another example, if processor A requests data from memory, processor B, C, or D may have a most recently modified version of the data in its cache. For example, assume that processor B has the modified data and is capable of sending the data directly to the requesting device, then the memory controller might indicate that the address transfer was received correctly (response 1), processor B indicates that it has a modified version of the data which it will be sending to the requesting device (response 3), while processors C and D might indicate that they have an invalid copy of the data from memory (response 2). In a further example, assume that processor A requests data from memory and processor B requires additional time to determine if the data is in its cache. Processor C has determined that it has a modified version of the data, but it is not capable of sending the modified data to the requesting device, i.e., processor A. Also, the memory controller has an address buffer overflow. In this example, the memory controller, processor B and processor C indicate that an address retry is required (response 4). This means that the requesting device must reinitiate the coherent memory transfer by sending the address request again. Processor D might have indicated that the address transfer was received correctly (response 1).

As the above examples demonstrate, there is a need in a processing system having multiple bus masters with cache means for at least four different snoop responses. Two approaches to implementing these responses are summarized in Tables 1 & 2, which show how a single signal line may be employed with an encoding of two serial bits to accommodate four different response options.

TABLE 1

Optimized For Cache-to-Cache Transfers of Modified Lines Only

Snoop Response Signal (SRESP)

| First Response Cycle | Second Response Cycle | Response Indicated |
|---|---|---|
| 1 | 1 | Address Acknowledge/Invalid Cache Line |
| 1 | 0 | Cache Hit - Shared or Exclusive Cache Line |
| 0 | 1 | Cache Hit - Modified Cache Line |
| 0 | 0 | Address Retry Required |

TABLE 2

Optimized For Cache-to-Cache Transfers of Modified, Exclusive or Shared Lines

Snoop Response Signal (SRESP)

| First Response Cycle | Second Response Cycle | Response Indicated |
|---|---|---|
| 1 | 1 | Address Acknowledge/Invalid Cache Line |
| 0 | 1 | Cache Hit - Shared or Exclusive Cache Line |

TABLE 2-continued

Optimized For Cache-to-Cache Transfers of
Modified, Exclusive or Shared Lines

Snoop Response Signal (SRESP)

| First Response Cycle | Second Response Cycle | Response Indicated |
|---|---|---|
| 1 | 0 | Cache Hit - Modified Cache Line |
| 0 | 0 | Address Retry Required |

Figure 2:
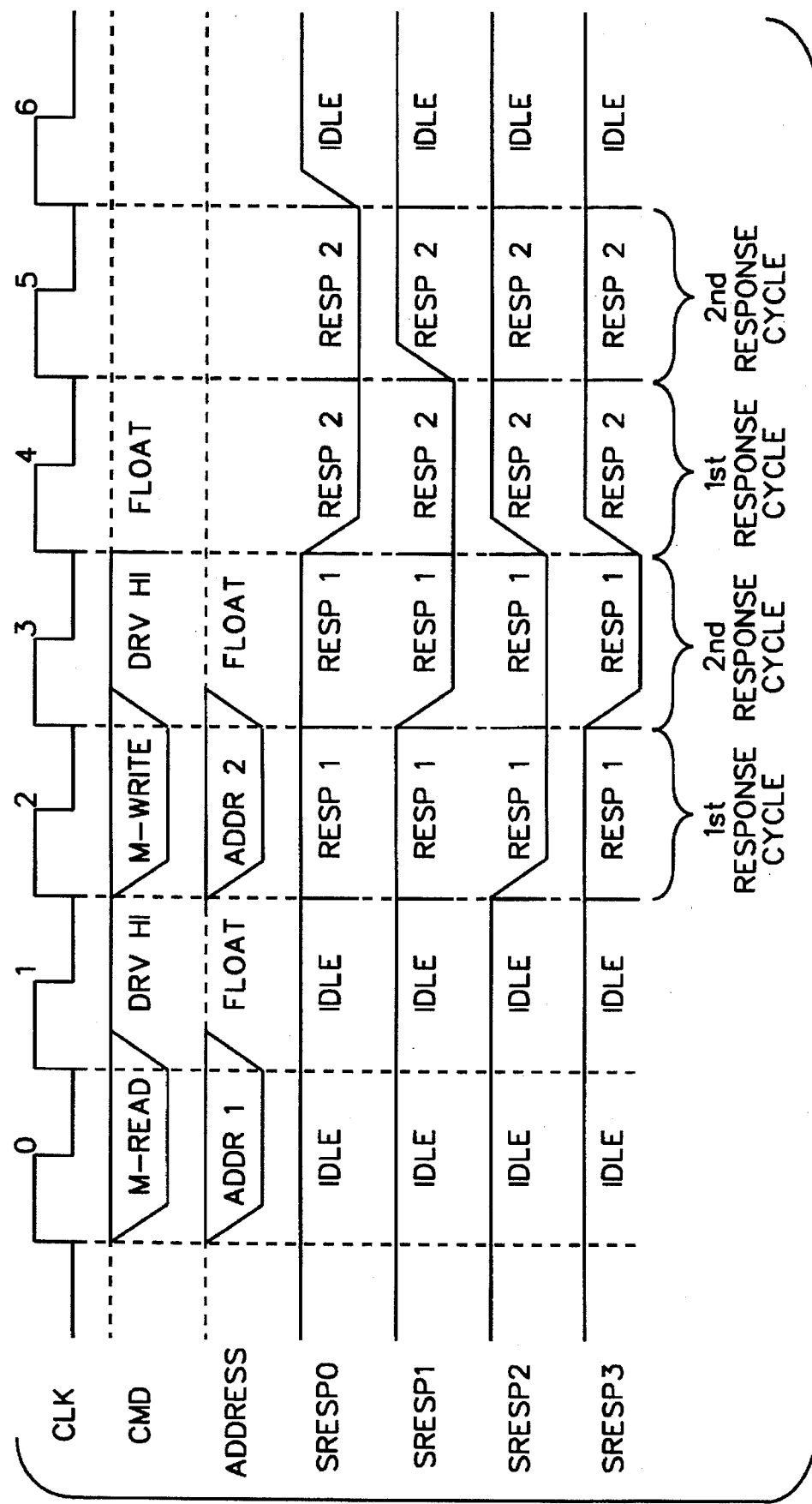
FIG. 2 is a timing diagram depicting representative responses to two coherent memory transactions, i.e., a read control command and a write control command, employing cache coherency in accordance with this invention.

FIG. 2 depicts by way of example a timing diagram for possible snoop responses, labelled RESP 1 and RESP 2, occurring in accordance with the present invention. Each snoop response occurs a fixed number of clock cycles after an address request is placed on the system bus to ensure that the requesting device will know when to check for input snoop response signals 'I'. The number of cycles can be programmable depending upon the bus devices in the system. However, once the caching is enabled, the snoop response timing is preferable fixed. In the example depicted in FIG. 2, a snoop response occurs in the second and third clock cycle after an address transfer initiates a coherent memory transaction. These cycles are labelled the 1st Response Cycle and the 2nd Response Cycle, respectively, in the timing diagrams.

The example of FIG. 2 again assumes that there are five bus devices, with devices 1-4 being processors A-D, respectively, and device 0 comprising a memory controller/ bridge chip. Further, device 4 is assumed to comprise the master of the address bus. This initiating device sends out two bus commands back-to-back. This highlights that, in accordance with the invention, coherent memory transactions can occur every two cycles on the system bus since in the preferred example, each snoop response requires only two clock cycles to complete, i.e., is two bits in length. The memory read bus command (M-READ) is valid high or low with address one (ADDR 1) during clock cycle 0. Each device receives the address for the bus transaction according to bus protocol. For this example, a valid command indicates a new bus transaction. The response for the address transfer is driven a fixed number of clock cycles, e.g., two cycles, from the address transfer, and what are referred to as the first and second response cycles preferably occur consecutively. The first response cycle for address one occurs during clock cycle two, and the second response cycle occurs during clock cycle three. Each device is constantly driving its snoop response signal in response to the bus command, which is driven high when the bus is idle.

By using the encoding of Table 1, the snoop response to the first address transfer in the timing diagram of FIG. 2 would be:

Device 0—Address Acknowledge with no hit

Device 1—Address Acknowledge and hit to a shared cache line

Device 2—Address Retry

Device 3—Address Acknowledge and hit to a shared line. The response to the second bus transaction of FIG. 2, i.e., the memory write command (M-WRITE) to address two (ADDR 2) would be:

Device 0—Address Retry

Device 1—Address Acknowledge and hit to a modified cache line

Device 2—Address Acknowledge with no hit

Device 3—Address Acknowledge with no hit.

To summarize, those skilled in the art will note from the above discussion that a novel method and system for handling cache coherency within a processing system are provided herein. The broadcast approach presented distributes snoop responses without delaying return of data to the requesting device and maintains device pin count at a minimum. By serializing snoop responses, each response is broadcast over a single signal line to each other bus master. Various response states can be encoded by broadcasting multiple binary bits in consecutive clock cycles on a single signal line. For systems using cache-to-cache transfers of modified data, the snoop response is preferably encoded to provide an early indication (e.g., within the first clock cycle of the snoop response) to the memory controller to continue or to abort the transaction. For systems using cache-to-cache transfers of modified, exclusive or shared data, the snoop response can be encoded to provide an indication (e.g., within the first response cycle) to the other caching devices that it may transfer the data to the requesting device. The approach presented employs unidirectional signals which eliminate turnaround time inherent in bi-directional signal approaches. One address transfer can occur every two clock cycles for coherent memory transactions employing this invention, i.e., assuming that a snoop response is defined to require two clock cycles. Each bus master except for the initiating device broadcasts a single signal response to each other bus master connected to the system bus.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. A cache coherency system for ensuring coherency of accessed data for each processor of a plurality of processors in a multiprocessor system, wherein each said processor has a caching means connected to a system bus which provides communication to a main memory for access of data stored therein, said cache coherency system comprising:

a plurality of snoop monitors, each processor of said plurality of processors including one snoop monitor of said plurality of snoop monitors for monitoring a coherent memory transaction on the system bus and for broadcasting in response thereto a unidirectional snoop response signal with reference to the processor's caching means when the coherent memory transaction is initiated by other than said processor;

interconnect means electrically coupling each snoop monitor to each other snoop monitor of the plurality of snoop monitors, wherein each snoop monitor receives at a separate signal input the unidirectional snoop response signal broadcast by each other snoop monitor of the plurality of snoop monitors in response to the coherent memory transaction on the system bus; and wherein each snoop response signal broadcast comprises one snoop response of a set of N predetermined snoop responses, each snoop response being M binary bits in length with a single bit of each snoop response signal being broadcast in a single clock cycle of the multiprocessor system such that said M binary bits are broadcast over M clock cycles, wherein $M \geq 1$ and $N = 2^M$.

2. The cache coherency system of claim 1, wherein each snoop response output signal comprises a serially encoded signal of said M binary bits in length transferred in M consecutive clock cycles of the multiprocessor system.

3. The cache coherenay system of claim 2, wherein M=2 such that N=4, said four predetermined snoop responses comprising a cache miss response, a cache hit with data unmodified response, a cache hit with data modified response, and an address retry required response.

4. The cache coherenay system of claim 2, further comprising a memory controller disposed between the system bus and main memory, and wherein $M \geq 2$ and a first binary bit of said M binary bits informs the memory controller whether to proceed to retrieve data from main memory pursuant to the coherent memory transaction.

5. The cache coherenay system of claim 1, wherein broadcasting of each snoop response signal is begun 'X' clock cycles subsequent to initiation of the coherent memory transaction on the system bus, wherein $X \geq 1$.

6. The cache coherency system of claim 1, further comprising a memory controller disposed between the system bus and main memory, said memory controller including a bus interface unit (BIU), said BIU receiving, via said interconnect means, each snoop response signal at a separate signal input, said BIU outputting to each snoop monitor an address retry required signal should a coherent memory transaction be unreceived.

7. The cache coherency system of claim 6, wherein each snoop response signal is optimized for cache-to-cache transfer of a modified data line, and wherein $M \geq 2$ and a first binary bit of each snoop response signal broadcast informs the memory controller whether to proceed with data retrieval from main memory pursuant to the coherent memory transaction and informs the caching means whether to begin direct cache-to-cache data transfer of a modified data line requested by the coherent memory transaction.

8. The cache coherency system of claim 6, wherein each snoop response signal is optimized for cache-to-cache transfer of modified, exclusive or shared data, and wherein $M \geq 2$ and a first binary bit of each snoop response signal informs a caching means having a modified, exclusive or shared copy of requested data whether to proceed or to abort a direct cache-to-cache transfer pursuant to the coherent memory transaction, and wherein a second binary bit of each snoop response signal informs the memory controller whether to proceed with data retrieval from main memory pursuant to the coherent memory transaction.

9. A cache coherency system for ensuring cohereney of accessed data for each bus master of a plurality of bus masters in a processing system, at least some bus masters having caching means connected to a system bus which provides communication to a main memory for access of data stored therein, said cache coherency system comprising:
   multiple snoop monitors, each snoop monitor being associated with a particular bus master of said at least some bus masters having caching means, each snoop monitor for monitoring a coherent memory transaction on the system bus and for broadcasting in response thereto a unidirectional snoop response signal with reference to the associated bus master's caching means when the coherent memory transaction is initiated by other than the associated bus master;
   interconnect means electrically coupling each snoop monitor to each other snoop monitor of the multiple snoop monitors, wherein each snoop monitor receives at a separate signal input each unidirectional snoop response signal being broadcast by each of at least some snoop monitors of the multiple snoop monitors in response to the coherent memory transaction on the system bus; and
   wherein each snoop response signal broadcast comprises one snoop response of a set of N predetermined snoop responses, each snoop response being M binary bits in length with a single bit of each snoop response signal being broadcast in a single clock cycle of the processing system with the M binary bits being broadcast over M clock cycles, wherein $M \geq 1$ and $N=2^M$.

10. The cache coherency system of claim 9, wherein said M binary bits of each snoop response signal are broadcast in M consecutive clock cycles of the processing system, and wherein M=2 such that N=4, said four predetermined snoop responses comprising a cache miss response, a cache hit with data unmodified response, a cache hit with data modified response, and an address retry required response.

11. The cache coherency system of claim 10, wherein one bus master of said plurality of bus masters comprises a memory controller coupled between the system bus and main memory, and wherein a first binary bit of each snoop response signal broadcast informs the memory controller whether to continue to retrieve data from main memory pursuant to the coherent memory transaction.

12. The cache coherency system of claim 9, wherein one bus master of said plurality of bus masters comprises a memory controller coupled between the system bus and main memory, said memory controller including a bus interface unit (BIU), said BIU receiving across said interconnect means, each snoop response signal at a separate signal input, said BIU broadcasting to each snoop monitor an address retry required signal should a coherent memory transaction be unreceived.

13. A method for ensuring coherency of accessed data for each processor of a plurality of processors in a multiprocessor system, wherein each said processor has a caching means connected to a system bus which provides communication to a main memory for access of data stored therein, each processor further including a snoop monitor coupled to the caching means and to the system bus, said method comprising:
   (a) monitoring the system bus for a coherent memory transaction;
   (b) at each of at least some processors of the plurality of processors in the multiprocessor system, responding to monitoring of the coherent memory transaction in said step (a) by broadcasting therefrom a unidirectional snoop response signal generated by the processor's snoop monitor with reference to the caching means coupled thereto; and
   (c) providing each broadcasted unidirectional snoop response signal to each other snoop monitor in the multiprocessor system via a separate signal input to the other snoop monitors, wherein each snoop response signal generated comprises one snoop response of a set of N predetermined snoop responses, each snoop response being M binary bits in length with a single bit of each snoop response being broadcast in a single clock cycle of the multiprocessor system, with the M binary bits being transferred over M clock cycles, wherein $M \geq 1$ and $N=2^M$, said generated unidirectional snoop response signals ensuring coherency of accessed data.

14. The method of claim 13, wherein said multiprocessor system includes a memory controller coupled between the system bus and main memory, and wherein said method further comprises at the memory controller, ascertaining based on the unidirectional snoop response signals whether to continue to retrieve data from main memory pursuant to the coherent memory transaction.

15. The method of claim 13, wherein said providing step (c) comprises serially transferring said M binary bits of each snoop response signal broadcast in M consecutive clock cycles, wherein $M \geq 2$.

16. The method of claim 13, wherein $M \geq 2$ and said responding step (b) comprises at each of the at least some processors referencing said processor's caching means to determine presence of an address requested in the coherent memory transaction and if present, determining from cache state bits a snoop response comprising at least one of a cache miss response, a cache hit with data unmodified response, a cache hit with data modified response, and an address retry required response.

17. The method of claim 13, wherein $M \geq 2$ and said responding step (b) comprises responding such that a first bit of said M binary bits of each snoop response signal broadcast informs each other snoop monitor in the multiprocessor system whether data retrieved from main memory pursuant to the coherent memory transaction should be accepted.

18. The method of claim 13, wherein said multiprocessor system includes a memory controller coupled between the system bus and main memory, and wherein said providing step (c) includes providing each unidirectional snoop response signal to said memory controller at a separate signal input thereto.

19. The method of claim 13, wherein M=2 and N=4 such that said method ensures coherency of accessed data notwithstanding the presence of a new coherent memory transaction on the system bus every two clock cycles of the multiprocessor system.

* * * * *

UNITED STATES PATENT AND TRADEMARK OFFICE
CERTIFICATE OF CORRECTION

PATENT NO. : 5,659,710
DATED : August 19, 1997
INVENTOR(S) : Sherman et al.

It is certified that error appears in the above-identified patent and that said Letters Patent are hereby corrected as shown below:

Column 9, line 1, claim 3,    "coherenay" should read --coherency--.

Column 9, line 6, claim 4,    "coherenay" should read --coherency--.

Column 9, line 12, claim 5,   "coherenay" should read --coherency--.

Signed and Sealed this

Nineteenth Day of May, 1998

Attest:

BRUCE LEHMAN

Attesting Officer     Commissioner of Patents and Trademarks